United States Patent Office 3,330,772
Patented July 11, 1967

3,330,772
HYDROUS OXIDE SOL OF URANIA AND THORIA AND PROCESS
Frederick T. Fitch, Baltimore, and Moises G. Sanchez and Milton C. Vanik, Severna Park, Md., assignors to W. R. Grace & Co., New York, N.Y., a corporation of Connecticut
No Drawing. Filed Dec. 7, 1964, Ser. No. 416,637
6 Claims. (Cl. 252—301.1)

This application is a continuation-in-part of application Ser. No. 196,018, filed March 23, 1962, now abandoned which is a division of application Serial No. 756,547, filed Aug. 22, 1958, now U.S. Patent 3,091,592.

This invention relates to hydrous oxide sols and more particularly to sols where the individual particles are substantially homogeneous mixtures of hydrous oxides. In one specific aspect, this invention relates to hydrous oxide sols suitable for use in single phase nuclear breeder reactors. In one type of breeder nuclear reactor, the fuel element is made up of a core of uranyl sulphate solution in a container surrounded by a layer of thorium oxide in an aqueous medium. The core provides a continuous source of neutrons which pass into the thoria mass, are captured by the thorium and converted in sequence to thorium 233, protactinium 233 and finally uranium 233. This conversion takes place with release of considerable energy. Uranium 233 is capable of fission with release of tremendous quantities of energy. In this type of reactor, the thorium provides energy and some new fissionable material at the same time.

The breeder "blanket" operates at a temperature about 250–300° C. with a flux of $10^{13}$ neutrons/cm.$^2$ sec. From the point of view of neutron efficiency, it is necessary to have a system free of elements with high neutron-capture cross-sections to insure that the thorium captures a maximum quantity of neutrons. It is also important to have present a moderator comprising an element or elements which can undergo elastic collisions with neutrons while not absorbing neutrons. In this manner, fast neutrons from the core are slowed down to thermal neutrons as they transfer their energy to the system. A suitable reactor combination will include:

(1) a source of fast neutrons (core of reactor);
(2) thorium dioxide as a breeder fuel; and
(3) heavy water as a moderator.

Heavy water is an excellent moderator because both oxygen and deuterium exhibit very low neutron-capture cross-sections. In addition, heavy water is an excellent heat transfer medium and can be cycled in and out of the reactor. The fast neutrons emitted by the core are slowed down by the heavy water moderator and are then absorbed by the thorium, which starts the above series of reactions whereby large amounts of energy are liberated and the "blanket" heated thereby.

Thoria-deuterium oxide in slurry form has been tried as a reactor "blanket." However, this use has been characterized by several difficulties. In the first place, slurries must be continuously agitated to prevent separation of the solids from the liquid. This alone gives rise to serious problems since it is very difficult to maintain agitation throughout a nuclear reactor system. The slurries are somewhat thixotropic and under quiescent conditions become quite viscous. The thoria particles undergo attrition and, on settling, tend to form a hard cake. In addition, the use of thoria particles of the size normally usable in slurry form erodes the system badly. Also, thoria slurries have poor heat transfer characteristics. These difficulties have hindered the use of thoria slurries for breeder "blankets."

It is conceivable that a non-corrosive mixture of dispersions of thoria and urania in the right proportions could eliminate the requirement of a core as a neutron source. For obvious reasons, such mixtures should preferably be non-corrosive. The presence of electrolytes in the breeder blanket is very undesirable because they are generally corrosive, especially at high temperatures.

In accordance with the present invention, we have now discovered a thoria-urania sol which is useful as a single-phase fuel which is substantially free of undesirable neutron capturing components, which is stable at temperatures employed in nuclear reactors and which contains the urania in intimate contact with the thoria, whereby the use of a core as a source of neutrons is eliminated.

The nuclear fuel of the present invention consists essentially of partially hydrated micelles of thoria and urania of uniform composition corresponding to the ratios desired for operation of a nuclear reactor. The present sol is substantially free of electrolytes and other contaminants which could capture neutrons.

The hydrous oxide sol of the present invention is prepared by forming a sol of thoria-urania particles. The sol of the present invention contains thoria and urania in the desired ratio, is stable to hydrothermal treatment, is essentially non-corrosive and is substantially free of neutron-capturing undesirable constituents. One very important use of this type of sol is as a combination neutron source and fuel whereby a single phase nuclear reactor system is possible.

Thoria-urania powders derived from the sols may be compacted and sintered to form compacts having a density close to theoretical. Densification is obtained readily at substantially lower temperatures than required for conventional thoria-urania powders.

Thoria-urania aquasols have been known for many years. The sols of the prior art were prepared by peptization methods which consisted of redispersing a washed hydrous thoria-urania gel or precipitate by heating in the presence of an acid such as HCl or $HNO_3$. In essence, the peptization method proceeds from a precipitate to a disperse system by breaking large particles into smaller ones. This method of preparation inherently requires starting with a highly hydrated gel or precipitate which can be broken down by the peptizing agent, that is the acid. Aged gels, particularly if aged at high temperatures tend to become less hydrated and at the same time become more difficult to peptize. Yields of peptized gel greatly decrease if more densified precipitates are used. Because of the technique or method of preparation peptized sols are characterized by micelles of highly irregular shapes. The peptized sols are also characterized by low pH which results in the presence of the acid required for peptization. The electrical conductivity is relatively high due to the high concentration of electrolytes present.

These basic characteristics limit the uses of the sols of prior art. The stability of the peptized sol is limited. On concentration, these sols tend to form thick hydrogels. The high electrolyte concentration is often undesirable in applications where high purity is needed. A high degree of hydration often results in excessive shrinkage during the drying and firing steps in the cases where these sols are used in making ceramic bodies. Another limitation of the sols in the prior art is the tendency to form gels on drying. During the final stages of drying, the micelles aggregate into very large particles outside the colloidal range. These gels are difficult to reduce to finely divided powders and are consequently difficult to disperse.

The products of our invention are, on the other hand, prepared by a condensation technique in which the final particle is spherical, or substantially so, with a density approaching theoretical. The build-up of the micelles proceeds from ionic and molecular thorium-uranium species by condensation and aggregation mechanisms. As opposed to peptized hydrogels, condensation sols contain well defined regularly shaped, spherical micelles of highly densified thoria-urania. This unique combination of micelle properties makes the condensation sols very stable and amenable to concentration to very high thoria-urania levels without gelling. Only trace quantities of acid are required to maintain stability, as evidenced by stable pH values barely below 7 and by their low electrical conductivity. The particles or micelles in these sols can be separated to form powders. These powders are easily redispersible with a minimum amount of grinding in other powders or matrices.

Although the process of preparing the sols is not part of this invention, a brief description of the methods of preparation is given which will help in explaining the properties of the products of our invention. This process is described in the parent application Ser. No. 756,547, filed Aug. 22, 1958, now U.S. Patent 3,091,592.

In describing this invention certain of the terms used are capable of more than a single interpretation and while the terms are here used in the usual and ordinary meanings, the following definitions are given in order to avoid any possible misunderstanding.

The term "thoria" includes thorium dioxide ($ThO_2$) in any crystalline or amorphous form. In aqueous colloidal solutions, with urania, thoria is present in chemical association with various amounts of water, as well as with the urania. Thoria may be regarded as including the family of substances theoretically obtainable by dehydration of thorium hydroxide ($Th(OH)_4$) and the products formed by splitting out water between two or more such substances. Thus the dehydration products of thorium hydroxide ($Th(OH)_4$) may be regarded as monomers and the products formed by condensing out water between two or more monomers are designated as polymers of thoria or thorium hydroxide.

The term "urania" as used in this application refers to the urania in the plus VI oxidation state. The urania might be considered as a minor component of the mixed sol since the urania is present in a maximum of 10% of the sol.

In this description "thoria-urania sols" include colloidal dispersions of thoria-urania in aqueous media. Colloidal solutions will be understood to include dispersions in which the size of thoria particles is from 1 to 500 millimicrons. The sols contain particles readily observable by means of an ultramicroscope and possess turbidity observable to the unaided eye.

The thoria-urania: acid ratio refers to the weight ratio of thoria-urania, to total acid expressed as HCl. For example, if the total thoria-urania in a particular sol is 40% $ThO_2$-$UO_2$ by weight, the total acid is 0.2% HCl by weight, the sol has a ratio of 200:1. The acid although expressed in the ratio as HCl may be present as any other monobasic acid. In such a case the weight of the acid present is calculated to a weight of HCl which is equivalent on the basis of acidity. This is a simple molar equivalence. As a practical matter, the acidity present is easily determined by a volumetric titration with a standard base.

The sedimentation index ($\Sigma$) of a spherical particle in a given fluid is defined as the product of the square of its diameter $D$ and the density difference between the particle and the fluid medium. Thus $$\Sigma = D^2 (\rho - \rho_0)$$

where $D$ = particle diameter
$\rho$ = micelle density
$\rho_0$ = dispersing medium density The sedimentation index can be determined by centrifugation or ultra-centrifugation. By measuring the rate of sedimentation under strong centrifugal fields, one can establish the sedimentation constant (S) which combines with Stokes Law to give $$S = \frac{\frac{dx}{dt}}{2_x} = \frac{D^2(\rho - \rho_0)}{18} = \frac{\Sigma}{18\eta_0}$$

where $S$ = sedimentation constant or rate of sedimentation per unit field acceleration
$dx/dt$ = rate of sedimentation
$w$ = angular velocity
$x$ = radius of rotation ($w^2 x$ = centrifugal acceleration)
$D$ = diameter of micelle
$\rho$ = density of micelle
$\rho_0$ = density of medium
$\eta_0$ = viscosity coefficient of medium
$\Sigma$ = sedimentation index The sedimentation index provides an excellent means of expressing, in a combined form, two of the most important particle characteristics of a colloid, namely the size and the density. Large values of $\Sigma$ are indicative of large particles exhibiting high density. The sedimentation index is expressed in $m\mu^2$ g./cm.$^3$. When applied to a group of particles of various sizes the index of sedimentation refers to the most frequent value of $\Sigma$ or mode. In some instances, a sol may possess a multimodal particle size distribution. In those cases, a multimodal distribution of sedimentation indices results and said sol would be characterized by several values of $\Sigma$. These would correspond to the maximal of the frequency distribution curve of sedimentation indices.

The term "relative kinematic viscosity" employed in describing this invention is used in its usual and ordinary meaning and refers to the ratio of the kinematic viscosity of the solution to the kinematic viscosity of the solvent. In this particular case, the solution is the thoria-urania sol and the solvent is water. For simplicity, we will use the term "relative viscosity" in describing the sols of our invention to mean relative kinematic viscosity.

The viscosity measurements used in determining the relative viscosity may be made according to conventional methods provided they are capable of adequate precision. Measurements made with a capillary pipette, for instance, under properly controlled conditions of temperature and pressure are adequate for this purpose.

The term "specific electrical conductance" $\sigma$ employed in this invention is used in its usual and ordinary meaning and refers to the electrical conductivity of one centimeter cube of colloidal solution at 25° C. Measurements may be made according to conventional methods. Specific electrical conductance is expressed in mhos/cm. High values of $\sigma$ of the order $10^{-6}$ mhos/cm. are indicative of a very low electrolyte concentration in the sol. Values for $\sigma$ of the order of $10^{-2}$ mhos/cm. are indicative of appreciable electrolyte concentration and hence of lower degree of purity.

The term "weight median diameter" ($\overline{D}$) employed in describing this invention refers to diameter calculated from electron micrograph counts and resulting frequency distribution of diameters. The method of calculation consists of grouping the particles as a function of their diameter as measured from electron micrographs. The number of particles in each group or diameter interval times the cube of the average diameter in the interval divided by the summation of all these terms represents the weight fraction of particles in the given interval. Mathematically, this expression becomes:

$$f_i = \frac{n_i D_i^3}{\sum n_i D_i^3}$$

where $f_i$ = weight fraction of particles in interval
$n_i$ = number of particles in interval
$D_i$ = average diameter of particles in interval the symbol $\Sigma_i$ means summation over all possible sizes and is not to be confused with the sedimentation index $\Sigma$ used elsewhere.

By making the intervals sufficiently small and by counting large number of particles from representative electron micrographs one obtains a good cumulative weight distribution curve of diameters. The diameter corresponding to the 50% point in this type of plot is called median diameter.

In carrying out the process for the preparation of the sols of our invention, we start with an aqueous solution of a thorium salt of a strong monobasic acid. Account may be taken of the fact that only a few of the thorium salts are soluble. The most important of these are the nitrates and the halides. The chlorates, perchlorates and bromates are also soluble, but they are not readily available. Of the halides, both the bromides and iodides are unstable in the presence of strong light and decompose to form the free halogen. Thus, the most important soluble thorium salts for the preparation of the sols of our invention are the nitrates and the chlorides. The same salts are also useful in the preparation of the urania in the plus VI state. The nitrates and chlorides are preferred and the perchlorates are also suitable for the present purpose.

In order to obtain a final thoria-urania sol of the necessary stability and low viscosity with a minimum of stabilization anions, it is necessary that the thoria-urania particles be spheroidal or substantially so, possess a high degree of densification, and be of uniform size of about 20 to 250 millimicrons weight median diameter, preferably 40 to 150 millimicrons weight median diameter, but still exhibiting colloidal properties.

Suitable thoria-urania sols can be prepared by gradually removing anions from dilute solution of thorium and uranium salts while maintaining the system at elevated temperatures. Preferred techniques suitable for anion removal are: (1) electrodialysis using an anion permeable membrane; (2) dialysis using an anion permeable membrane; (3) ion exchanges using a resin in the hydroxide form; (4) decomposition of the salt of a volatile acid; (5) electrolysis of mixed uranium and thorium salts, the anions of which is oxidized to a volatile compound or state.

It is not readily apparent from theoretical consideration that the sols of our invention would exhibit high micelle density, uniform spherical micelles, and be very stable. Any explanation which might be offered would not be easily susceptible of experimental proof. The hydrolysis of the salt at the higher temperatures, occurring on removal of the anions, results in the formation of sol micelles of these very desirable characteristics. At low temperature, highly hydrated thoria-urania is obtained in which the volume of the micelles is very large in relation to the number of ThO/$UO_2$ units contained. In other words, the micelle exhibits low density. If sufficiently low temperature is used, a gel may be obtained upon removal of anions. Such a gel, of course, can be peptized by heating after acid addition. The mechanism of growth need not be limited to polymerization of small units or monomers to large units. It can also proceed by aggregation of two or more large units into a single colloidal particle. The resulting sols at elevated temperatures thus contain a relatively small number of larger dense particles which have less tendency to unite with each other and hence these sols have less tendency to gel.

Differentiation between the products of this invention and the sols of the prior art will become apparent from a comparison of their properties and characteristics.

Electron micrographs clearly show the difference between the sol of the present invention and the peptization sol of the prior art. The peptization sol is characterized by a lack of sphericity and irregular shape of the particles as well as low density. The sols of our invention are composed of discrete spheroidal particles of high density.

The sedimentation index (which, as we have discussed earlier, reflects a combination of density and particle size) dramatically shows the difference between the peptization sol of the prior art and the condensation sol of our invention. The typical value of $\Sigma$ in a peptized sol is about 500 m$\mu^2$ g./cm.$^3$. The sigma value of a condensation sol can be as high as 500,000 m$\mu^2$/cm.$^3$ and in the case of individual particles may reach 3,000,000 m$\mu^2$ g./cm.$^3$.

The physical appearance of the two types of sols in question is strikingly different. While a peptization sol is transparent and barely turbid, the condensation sols are yellowish and practically opaque.

The particle size, shape and density of condensation sols are of course dependent upon the conditions of preparation. In general, use of high temperature cycling during preparation results in denser, larger micelles than when lower temperatures are used. By proper choice and control of the rate of anion removal, temperature programming, thoria concentration, etc., it is possible to obtain condensation sols containing spherical, dense particles ranging in size from about 10 m$\mu$ to about 500 m$\mu$.

The amount of acid required to stabilize a condensation thoria-urania sol is very small, as evidenced by the fact that they are stable at pH values above 7 at specific conductances as low as $10^{-6}$ mhos/cm. On the other hand, peptization sols require higher concentrations of acid as evidenced by the fact that at pH values higher than about 4 gelation or precipitation occur.

Because of their superior stability, condensation thoria-urania sols can be deionized to remove essentially all traces of electrolytes. Upon passing through a column of mixed cation-anion exchange resin they remain fluid and do not flocculate. Addition of very small traces of acid to pH just below 7 insures continued stability and long shelf life. Attempts to deionize a peptization sol under otherwise identical conditions invariably results in gelation of the hydrated metal and clogging of the resin column.

A further indication of the higher purity level of the sols of our invention is given by electrical conductivity measurements. While peptization sols have specific electrical conductances of about $10^{-2}$ mhos/cm., condensation sols may exhibit values as low as $10^{-6}$ mhos/cm. Since the stability of a sol depends upon its low electrolyte concentration, the lower end of the electric conductivity range is preferred.

A good method of expressing the relative amount of acid in a thoria-urania sol is by a thoria-urania HCl ratio defined earlier. The thoria-urania to HCl ratio in peptization sols ranges from 5:1 to 15:1, while in the condensation sols of our invention the ratio ranges from 10:1 to 10,000:1, preferably from 30:1 to 1000:1.

The particle size distribution in the sols of the prior art is very wide ranging from a few millimicrons to several hundred millimicrons. The examination of electron micrographs of the peptization sols shows the presence of very many small particles as well as large irregular particles. This lack of uniformity is contrasted by the very uniform, nearly spherical, micelles of the sols of our invention and by the narrow distribution of particle size.

In summary, the thoria-urania sols produced by condensation methods, which are the subject of our invention are characterized by having a thoria-urania to HCl ratio of 10:1 to 10,000:1 and preferably having a ratio of 30:1 to 1000:1. They contain discrete, spherical, dense thoria-urania particles with weight median diameters from about 10 m$\mu$ to about 200 m$\mu$, preferably from 40 m$\mu$ to 150 m$\mu$. They exhibit relative viscosities of from 1.00 to 1.2 at 10 weight percent thoria-urania at 25° C., preferably in the range of 1.00 to 1.03. They exhibit sedimentation indices of 1000 to 3,000,000 m$\mu^2$ g./cm.$^3$ and preferably of 3000 to 500,00 m$\mu^2$ g./cm.$^3$. They are stable at pH values of from 2 to 7 and preferably 4 to 7. Their specific electrical conductance ranges from $10^{-2}$ to $10^{-6}$ mhos/cm. but are preferably in the range of $10^{-3}$ to $10^{-5}$ mhos/cm. In a particularly useful aspect of the invention, the product contains from 1 to 65% by weight of $ThO_2$ as a stable colloidal dispersion in water. The urania content of the particles vary from 0.01 to about 10%.

The invention is further illustrated by the following specific but non-limiting examples.

EXAMPLE I

A thoria-urania sol was prepared by dissolving 431 grams of $(NO_3)_4 \cdot 4H_2O$ and 18.5 grams of

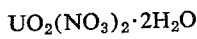
$$UO_2(NO_3)_2 \cdot 2H_2O$$

in sufficient deionized water to yield a single solutiton weighing 4100 grams. Of this amount 3750 grams were taken for the present run. The equipment consisted of a tank of sufficient size to act as a reservoir having a means for maintaining the solution near its boiling point. An outlet line leaving the reservoir passed through a water-cooled heat exchanger into a Sigma motor pump which pumped the solution through the cathode compartment of an electrodialysis cell and thence through a preheater into the reservoir. The cell was of generally flat circular shape made up of opposing concave shells with an anion exchange (Amberplex A-1) membrane positioned between them and forming cathode and anode compartments. The electrodes were discs of 45 mesh platinum gauge positioned on each side of the membrane. Deionized flushing water was continuously passed through the anode compartment.

The temperature in the reservoir was maintained at about 98–99° C. The solution was withdrawn at a rate of about 100–120 cc./min. through a cooler, where its temperature was reduced to 25–30° C., and then through the pump into the cathode compartment of the cell, thence into a preheater where its temperature was raised to 70–90° C. at which temperature it was returned to the reservoir.

Starting with a current of 10 amperes, the electrodialysis was completed in 20.5 hours. The resulting light orange thoria-urania sol weighed 3369 g., had a specific gravity of 1.04, a pH of 4.0 and a solids content of 4.65%. An electron micrograph of some of this product showed that the thoria-urania was present as well-formed spherical particles ranging downward from about 60 millimicrons and having an average diameter of about 40 millimicrons.

EXAMPLE II

A thoria sol was prepared by the peptization technique by dissolving 400 grams of thorium nitrate in 6 liters of water. The hydroxide was precipitated by adding 200 ml. of concentrated ammonia. The slurry was filtered under vacuum and washed until free of electrolytes. The precipitate was transferred to a resin kettle and 90 ml. of 2 N nitric acid was added. The mixture was heated to 100° C. with strong stirring. The product was recovered as a clear, translucent sol. It contained 15 grams per liter to 100 ml. of $ThO_2$. The pH of the sol was 3.9, the specific conductance was $1.00 \times 10^{-2}$ mhos/cm. It had a relative viscosity of 1.07.

EXAMPLE III

An attempt was made to prepare a thoria-urania sol by the peptization technique. A solution was prepared by dissolving 400 grams of thorium nitrate and 50 grams of uranyl nitrate $UO_3(NO_3)_2$ in 6 liters of water. The hydroxide was precipitated by adding 200 ml. of concentrated ammonia. The slurry was filtered under vacuum and washed until free of electrolytes. The precipitate was transferred to a resin kettle and 90 ml. of 2 N nitric acid was added. The mixture was heated to 100° C. with strong stirring. The product recovered contained 16.4 grams of solids per 100 ml. The pH was 4.1, the specific conductance was $1.13 \times 10^{-2}$. This mixture was centrifuged for 20 minutes at a speed of 6,000 r.p.m. The supernatant liquid was removed and the residue washed and recentifuged. Analysis of these two portions show that the bulk of the urania was present in this supernatant and the bulk of the thoria in the residue. Thus a mixed sol containing both oxides in the colloidal particles is not produced by the peptization technique.

This is to be expected from the hydrolysis and precipitation pH of urania. This run illustrates that the advance technique of Example I is required to prepare a mixed thoria-urania sol.

EXAMPLE IV

Viscosity measurements were made on the sols prepared by the peptization technique described in Example II and compared with the sols of the instant invention. The relative viscosities at 25° C. of the peptization sol and the condensation sol are shown in Table I.

TABLE I

[Relative Viscosities at 25° C.]

| Percent Solids | Peptization | Condensation |
|---|---|---|
| 10 | 1.05 | 1.01 |
| 20 | 1.12 | 1.07 |
| 37 | 1.46 | 1.18 |

An increase in viscosity with increasing solids concentration is accompanied by an increased tendency for gelation to occur. The sols of the instant invention can be concentrated to greater than 60% solids before thickening takes place on cooling. Even when the sols of the instant invention become pasty on cooling, they can be easily redispersed upon dilution. This is in contrast to the peptization sols which are not redispersible once gelation has occurred. In the peptization sol, non-reversible gelation often occurs at concentrations of 37 to 40% solids.

Obviously many modifications and variations of the invention, as hereinabove set forth, may be made without departing from the essence and scope thereof, and only such limitations should be applied, as indicated in the appended claims.

What is claimed is:

1. As a composition of matter a sol consisting of an aqueous dispersion of dense spherical particles of thoria-urania in the size range of 25 to 60 millimicrons, consisting of thoria having up to 10 weight percent urania, uniformly dispersed therethrough.

2. As a composition of matter, a sol consisting of an aqueous dispersion of dense spherical particles of thoria-urania having a pH of 2 to 7, a specific conductance of $1 \times 10^{-2}$ to $1 \times 10^{-6}$ mhos/cm. and a sedimentation index of 1000 to 3,000,000 m$\mu^2$/g., said sol particles consisting of thoria having up to 10 weight percent urania dispersed therethrough.

3. As a composition of matter, a sol consisting of an aqueous dispersion of dense spherical particles of thoria (IV) and urania (VI) in the size range of 25 to 60 millimicrons consisting of thoria (IV) having up to 10 weight percent urania (VI) dispersed therethrough.

4. As a composition of matter, a sol consisting of an aqueous dispersion of dense spherical particles of thoria (IV) and urania (VI) having a pH of 2 to 7, a specific conductance of $1 \times 10^{-2}$ to $1 \times 10^{-6}$ mhos/cm. and a sedimentation index of said sol particles consisting of thoria (IV) having up to 10 weight percent urania (VI) dispersed therethrough.

5. As a composition of matter a stable sol consisting of an aqueous dispersion of dense spherical colloidal sized particles of thoria (IV) and urania (VI) having a solids content of 0.1 to 65%, a pH of a specific conductance of $1 \times 10^{-2}$ to $1 \times 10^{-6}$ mhos/cm., said sol particles consisting of thoria (IV) having up to 10 weight percent urania (VI) dispersed therethrough.

6. The method of forming a stable thoria-urania aquasol comprising the steps of forming a mixed aqueous solution of thorium (IV) and uranium (VI) salts, heating said solution to about 98 to 99° C., withdrawing a portion of said mixed solution dialyzing said portion to remove anions and returning said portion to the larger body of solution that contained said withdrawal, dialysis and returning back to said larger body until the solution is substantially electrolyte free and recovering the product sol.

References Cited
UNITED STATES PATENTS 3,091,592  5/1963  Fitch et al. _____ 252—301.1

FOREIGN PATENTS 1,279,655  11/1961  France.

CARL D. QUARFORTH, *Primary Examiner.*
BENJAMIN R. PADGETT, *Examiner.*
S. J. LECHERT, JR., *Assistant Examiner.*